R. J. PIERCE.
WIND SHIELD FOR MOTOR CYCLES.
APPLICATION FILED MAR. 6, 1917.

1,232,966.

Patented July 10, 1917.

INVENTOR
R. J. PIERCE

BY
Milton S. Crandall
ATTORNEY

UNITED STATES PATENT OFFICE.

ROY J. PIERCE, OF SHERIDAN TOWNSHIP, CHEROKEE COUNTY, IOWA.

WIND-SHIELD FOR MOTOR-CYCLES.

1,232,966.

Specification of Letters Patent.

Patented July 10, 1917.

Application filed March 6, 1917. Serial No. 152,571.

*To all whom it may concern:*

Be it known that I, ROY J. PIERCE, a citizen of the United States, and a resident of Sheridan township, in the county of Cherokee and State of Iowa, have invented certain new and useful Improvements in Wind-Shields for Motor-Cycles, of which the following is a specification.

The present invention relates to wind-shields and more particularly to wind shields for motor cycles, bicycles and other vehicles usually carrying a single rider.

The invention has for its primary object the production of an improved adjustable wind-shield for single passenger vehicles.

Another object of the invention is the production of a wind shield particularly adapted for motor-cycles and embodying certain novel features of construction whereby the shield may be adjusted at any desired height or angle for use or readily lowered to an inoperative position out of the way of the driver.

Still another object of the invention is the production of a wind shield for motor-cycles and bicycles readily adjusted, inexpensive in construction, thoroughly efficient and adapted to be instantly installed upon any motor-cycle or bicycle now in use.

Figure 2:
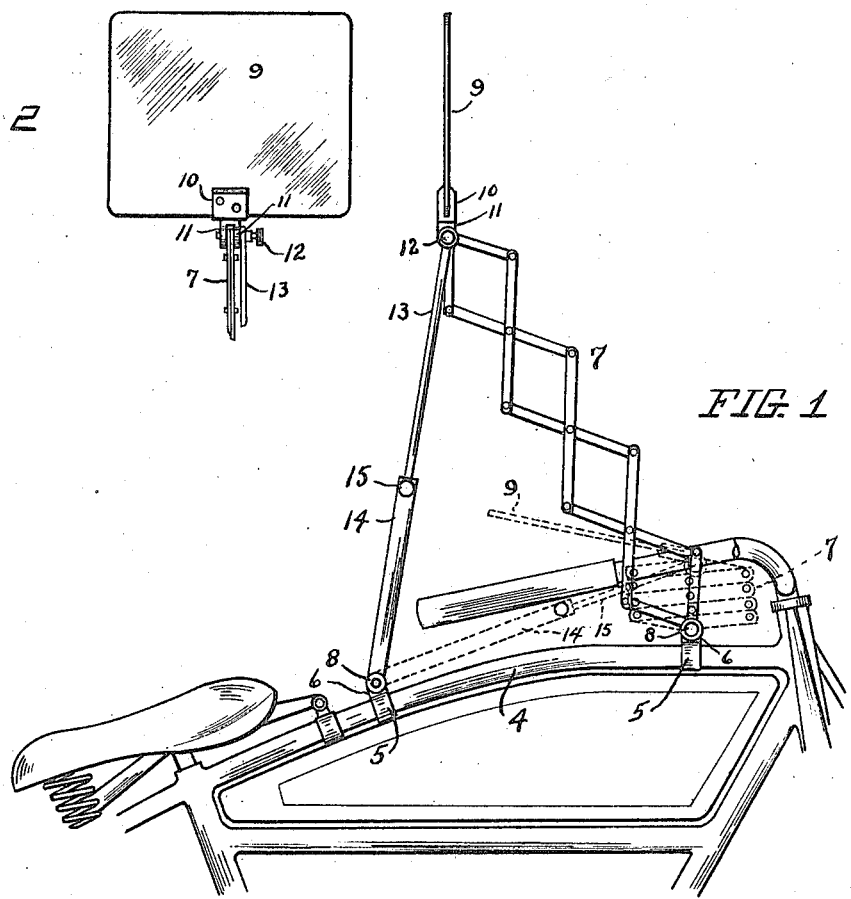
Figure 1:
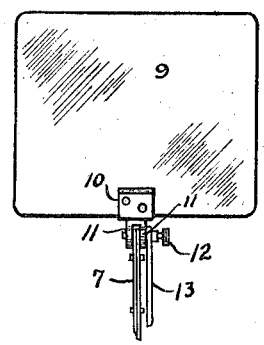
Figure 3:
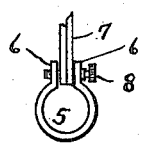

With these and other objects in view, the invention consisting in the construction, combination and novel arrangement of parts will be fully understood from the following description reference being had to the accompanying drawings which form a part of this application and in which like characters of reference indicate corresponding parts throughout the several views, of which, Figure 1 is a fragmentary elevation of a motor-cycle equipped with the preferred embodiment of the invention;

Fig. 2 is a rear elevation of the wind shield and parts associated therewith, and Fig. 3 is one of the securing clamps.

Although, I have illustrated and hereinafter described the preferred embodiment of the invention, I would not be understood as being limited to the specific structure chosen for illustration for various alterations and modifications in the details of construction and arrangements of parts may be made without departing from the spirit and scope of the invention as defined in the appended claims.

Referring, now, to the illustrations, 4, is the upper cross-bar of the frame of a motor-cycle which member preferably serves as the support for my device. Adjacent the end portion of the bar, 4, I mount suitable clamps preferably consisting of split collars 5, which encircle the bar, 4, and the ends of which are provided with upwardly extending ears, 6. Between the ears, 6, of the foremost clamp is interposed the lower end of lazy-tongs, 7, pivoted on a thumb screw, 8, which passes freely through one of the ears, 6, and the lazy-tongs, and is threaded into the opposite ear. The thumb screw 8, serves as a pivot for the lower end of the lazy-tongs and also as means for securing the clamp to the vehicle frame, and as an adjustment for the lazy-tongs. 9, is the wind shield proper, which may be of any preferred size and construction and provided at its lower edge with a suitable supporting bearing as the plate, 10, which is split to receive the wind-shield and suitably secured thereto. The plate is provided with depending ears, 11, between which is interposed the upper end of the lazy-tongs secured to the ears by means of a thumb screw, 12, which freely passes through an extensible rod, one of the ears, 11, the lazy-tongs and is threaded into the companion ear. The extensible rod consists preferably of a rod, 13, telescoping a tubular rod, 14, and adjustably secured therein, by means of a set-screw, 15, threaded into the latter rod to engage the former. The lower end of the tubular rod is pivotally secured to the rearmost of the clamps, 5, by means of a thumb screw, 8, which pass freely through the tubular rod 14, and one of the ears and is threaded into the companion ear.

It is evident that the wind shield may be adjusted to any desired angle and at any desired height or distance from the rider. When not in use the device may be readily lowered to the position shown in dotted lines in Fig. 1 in which position it will be entirely out of the way of the driver.

Having thus described my invention, what I claim as new and desire to secure by Letters Patent of the United States, is,—

1. A wind shield for a vehicle comprising a wind-shield proper, lazy-tongs pivotally secured at one end to the wind-shield and adapted to be pivoted at the other end to the vehicle, and an extensible rod pivotally secured at one end to the wind shield and adapted to be pivotally secured at the other end to the vehicle.

2. A wind shield for a vehicle of the class described having an upper cross-bar, comprising front and rear clamps adapted to be secured to the cross-bar, a wind-shield, lazy-tongs pivoted at one end to the wind-shield and at the other to the front clamp, and an extensible rod pivoted at one end to the wind-shield and at the other to the rear clamp.

3. A wind-shield for a vehicle of the class described having an upper cross-bar, comprising a wind-shield proper, lazy-tongs pivoted at one end to the wind shield and at the other to the front end portion of the cross-bar, and an extensible rod pivoted at one end to the wind-shield and at the other to the rear portion of the cross-bar.

4. A wind shield for a vehicle of the class described, having an upper cross-bar, comprising a wind-shield, a bearing on the lower edge thereof, lazy tongs pivotally secured at one end to the bearing, a member pivotally secured to the other end of the lazy-tongs and adapted to be secured to the forward portion of the cross-bar, an extensible rod pivotally secured at one end to said bearing, a member pivotally secured to the other end of the rod and adapted to be secured to the rear portion of the cross-bar, and means for tightening the pivotal points of the rod and lazy-tongs to prevent relative movement between the wind-shield, rod and lazy-tongs.

In testimony whereof, I have hereunto set my hand this 16th day of February, 1917.

ROY J. PIERCE.

Copies of this patent may be obtained for five cents each, by addressing the "Commissioner of Patents, Washington, D. C."